United States Patent [19]
Peterson, Jr. et al.

[11] Patent Number: 5,994,857
[45] Date of Patent: Nov. 30, 1999

[54] LAWN AND GARDEN TRACTOR INTERLOCK CIRCUIT

[75] Inventors: Rudolph Andrew Peterson, Jr.; Barry Michael Hough, both of Beaver Dam, Wis.

[73] Assignee: Deere & Company, Moline, Ill.

[21] Appl. No.: 09/021,913

[22] Filed: Feb. 11, 1998

[51] Int. Cl.⁶ .......................... B60K 28/00; B60K 41/28
[52] U.S. Cl. .......................... 318/282; 318/139; 307/9.1; 180/53.1; 180/273; 192/0.094
[58] Field of Search ...................... 318/138, 139, 318/282; 307/9.1, 10.6; 180/273, 53.1, 272, 271, 214; 192/0.094, 0.09, 12 D, 13 A, 84 R, 143, 1.2, 4 C, 4 A; 303/13; 123/179.24, 179.4, 179.5, 179.23

[56] References Cited

U.S. PATENT DOCUMENTS

| | | | |
|---|---|---|---|
| 4,974,711 | 12/1990 | Peterson, Jr. et al. | 192/12 D |
| 5,078,104 | 1/1992 | Peterson, Jr. | 123/179.24 |
| 5,203,440 | 4/1993 | Peterson, Jr. et al. | 192/0.094 |
| 5,314,038 | 5/1994 | Peterson, Jr. | 180/214 |
| 5,616,964 | 4/1997 | Peterson, Jr. | 307/9.1 |
| 5,630,489 | 5/1997 | Bebernes | 192/4 C |
| 5,645,135 | 7/1997 | Peterson, Jr. | 180/272 |

*Primary Examiner*—Paul Ip

[57] ABSTRACT

An interlock system for a lawn and garden tractor or similar vehicle includes a PTO switch having off, on and momentary on positions and connected to a latching relay to provide PTO operation in reverse if the switch is moved to the momentary on position prior to the vehicle being shifted into reverse. Once the vehicle is operating in reverse with the PTO activated, the operator can release the switch from the momentary on position and the PTO will remain activated. However, once PTO operation has been interrupted for any reason, the PTO can be reenergized only after reverse operation has been stopped and the PTO switch has been moved to the off position.

15 Claims, 2 Drawing Sheets

LAWN AND GARDEN TRACTOR INTERLOCK CIRCUIT

BACKGROUND OF THE INVENTION

1) Field of the Invention

The present invention relates generally to lawn and garden tractors or similar vehicles with an attachment driven by a controllable tool drive or power take off (PTO), and more specifically to an interlock circuit for such a vehicle.

2) Related Art

Vehicles such as some lawn and garden tractors with PTO driven attachments include an interlock circuit with several functions including the prevention of PTO operation when the vehicle is placed in reverse. Under certain conditions, operation of the PTO while the vehicle is in reverse is necessary. Various override systems have been proposed for this purpose, but most are difficult or inconvenient to operate. For example, one type of available override system on a mower allows PTO operation when the vehicle is backing up, but only after the PTO is automatically disconnected during the shift into reverse. Another type requires the operator to continuously push a switch during reverse operation. Providing an interlock circuit with an override feature that is simple, convenient, reliable and easy to connect to existing interlock circuitry has been a continuing source of difficulty.

BRIEF SUMMARY OF THE INVENTION

It is therefore an object of the present invention to provide an improved interlock circuit for a lawn and garden tractor or similar vehicle. It is a further object to provide such an improved circuit which overcomes the aforementioned problems.

It is a further object of the present invention to provide an improved interlock circuit with an override function which facilitates PTO operation when the vehicle is in reverse provided certain operating conditions exist on the vehicle. It is yet another object to provide such an interlock circuit which is relatively simple, reliable and easy to understand and operate. It is a further object to provide such a circuit which does not require the operator to continuously push or hold a switch.

It is yet another object to provide an improved interlock circuit with an override switch for maintaining PTO operation under certain conditions when the vehicle is in reverse. It is a further object to provide such a circuit which can be easily and reliably operated using a switch with off, on or run, and momentary on positions. It is a further object to provide such a circuit which permits an operator to shift the vehicle into reverse without having to restart the PTO if certain preselected conditions exist on the vehicle.

It is another object of the present invention to provide an improved interlock circuit including a latch circuit permitting PTO operation under preselected conditions, wherein the latch circuit requires input from a momentary on switch and PTO activation by the momentary on switch is prevented once the PTO is off.

An interlock system constructed in accordance with the teachings of the present invention includes a PTO switch having off, on and momentary on positions and connected to a latching relay circuit to provide PTO operation in reverse if the switch is moved to the momentary on position prior to the vehicle being shifted into reverse. Once the vehicle is in reverse with the PTO activated, a latch relay bootstrapped to the on condition permits the operator to release the switch from the momentary on position and the PTO will remain activated. However, once the latching relay circuit shuts down the PTO for any reason, the PTO can only be reenergized by first moving the PTO switch to the off position and then back to the on position. The momentary on position of the PTO switch cannot be utilized to initialize PTO operation but only to maintain PTO operation.

These and other objects, features and advantages of the present invention will become apparent to one skilled in the art upon reading the following detailed description in view of the drawings.

DETAILED DESCRIPTION OF THE DRAWINGS

Figure 1A:
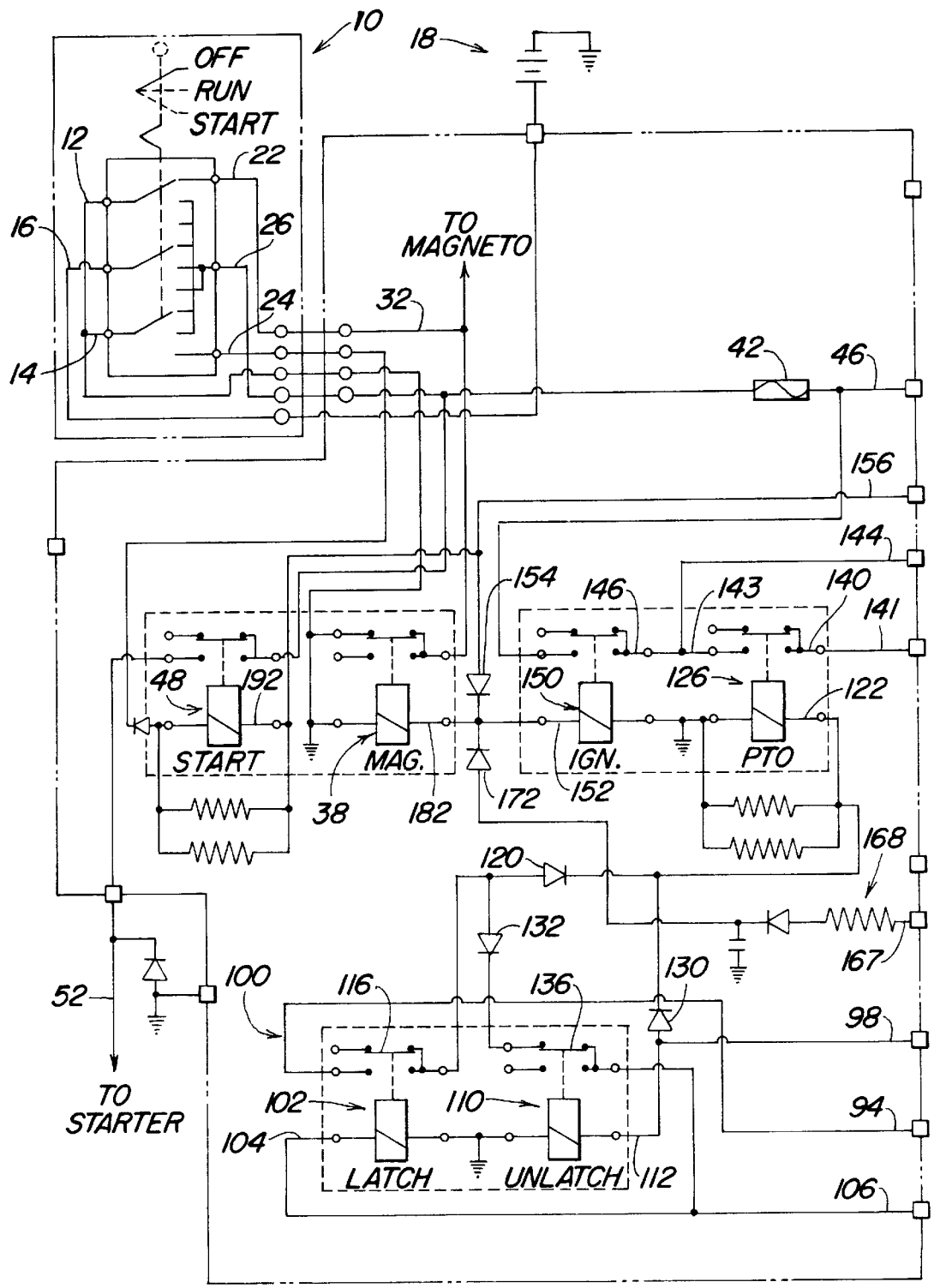
FIGS. 1a and 1b show a schematic of an interlock system for a vehicle such as a lawn and garden tractor, including a bypass circuit for operating the PTO while the vehicle is in reverse.
Figure 1B:
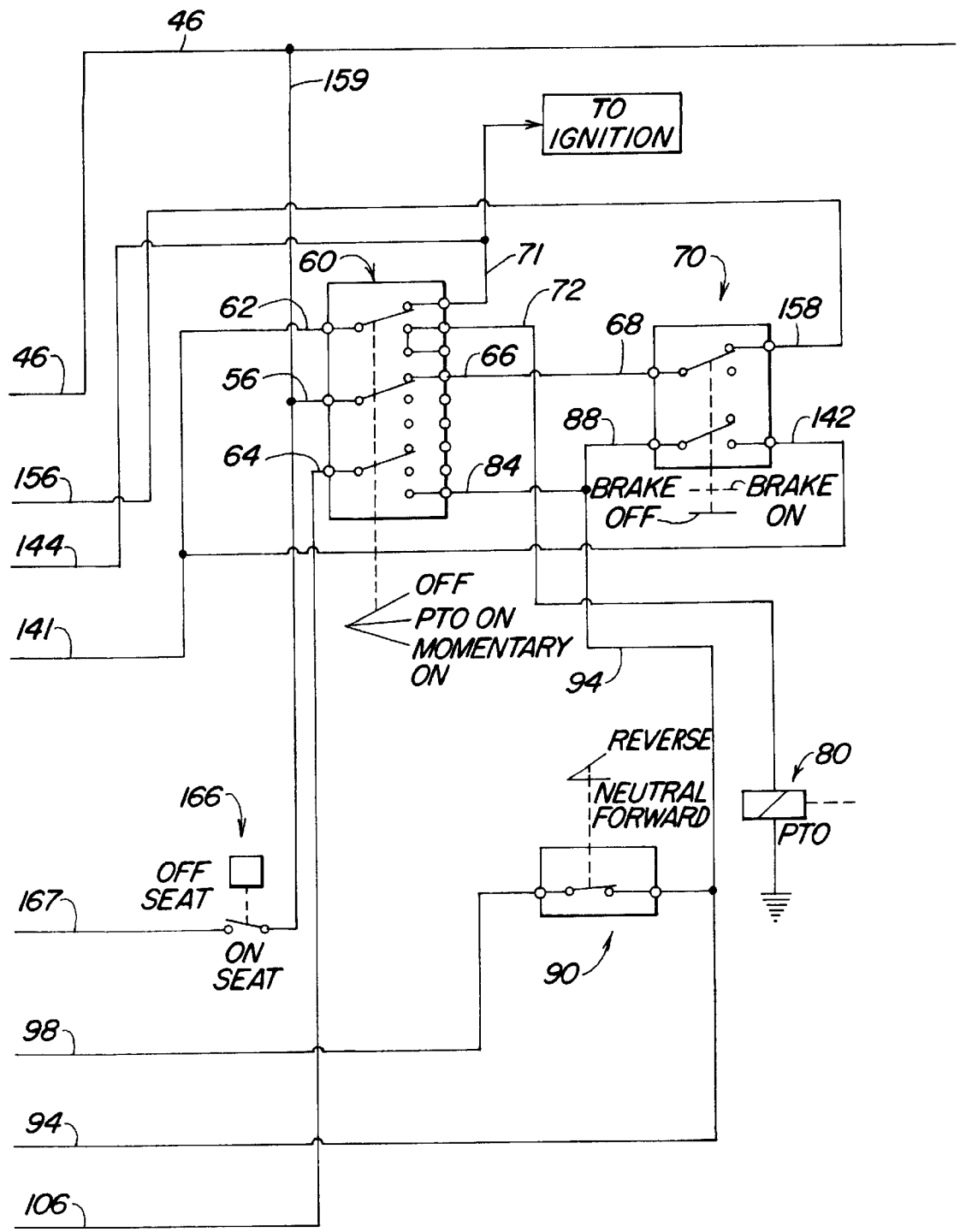

Referring now to FIGS. 1a and 1b, therein is shown circuit schematic for a vehicle such as a lawn and garden tractor having an ignition switch 10 with switch input terminals 12 and 14 connected to ground and an input terminal 16 connected to the source of electrical power 18 on the vehicle. The switch 10 includes an off (uppermost) position, a run (center) position, and a start (lowermost) position. A closed path is provided from the terminal 12 to the terminal 22 only when the switch 10 is in the off position as shown. The output terminal 26 is connected to the input terminal 16 and to the source of power 18 when the switch 10 is in the run or the start position. The terminal 24 is connected to ground through the terminal 14 only when the switch 10 is in the start position.

The terminal 22 is connected by line 32 to a magneto shut-down terminal 34 and to the switched input terminal of a magneto relay 38 to assure engine kill when the ignition switch 10 is moved to the off position. The terminal 26 is connected through a fuse 42 to a switched power line 46 and to the switched input terminal of a start relay 48. The start relay 48 is activated and powers a line 52 to the starter when certain preselected conditions on the vehicle are satisfied and the switch 10 is moved to the start position.

The switched power line 46 is connected to a central input terminal 56 (FIG. 1b) of a PTO switch 60 having off, on, and momentary on positions and additional input terminals 62 and 64. The switch 60 is biased to the on position when in the momentary on position. A central output terminal 66 is connected to an input terminal 68 of a park brake switch 70 to provide power from the switched power line 46 to the terminal 68 only if the PTO switch 60 is in the off position. A first upper output terminal 71 of the PTO switch 60 is connected to an ignition line. A second upper output terminal 72 is connected to the activation coil of an electric PTO clutch 80 so that when the PTO switch 60 is in the on or the momentary on position, a closed path is provided from the terminal 62 to the coil of the clutch 80. The lowermost output terminal 84 is connected to a second input 88 of the park brake switch 70 and to an input terminal of a reverse sensing switch 90 via latch power line 94 which provides a path from the switches 60 and 70 via line 98 to bypass latch/unlatch relay structure 100 (FIG. 1a) when the vehicle is in a neutral or forward gear. The reverse switch 90 opens when the vehicle is placed in reverse.

The relay structure 100 includes a bypass latching relay 102 having a control input 104 connected by a line 106 to the input terminal 64 of the PTO switch 60. The relay structure 100 also includes an unlatching relay 110 having a control input 112 connected by the line 98 to the output terminal of the reverse sensing switch 90 so that when the line 94 is powered and the vehicle is out of reverse (switch 90 closed as shown) the unlatching relay will be activated. The latching relay 102 includes a switched output 116 having a terminal connected via line 94 to the output terminal 84 of the PTO switch 60. The opposite terminal of the switched output 116 is connected through a blocking diode 120 to a PTO control input 122 of a PTO relay 126. The PTO control input 122 is also connected via blocking diode 130 and the line 98 to the output terminal of the reverse sensing switch 90. The PTO relay will activate only if the reverse sensing switch 90 is closed (vehicle not in reverse) with power applied to the input of the switch 90 (PTO on and park brake off) or if the relay 102 is activated (PTO switch 60 in the momentary on position) with the line 94 powered. The output terminal of the switched output 116 is connected by a diode 132 to the upper terminal of the switched output 136 of the unlatching relay 110 so when the relay 110 is in the position shown (not activated), a closed path is provided between the switched output 116 of the latching relay 102 and the control input 104 of the relay 102 to bootstrap the relay 102 in the on position, provided the line 94 is powered and the relay 110 remains inactivated. Once the vehicle is taken out of reverse so the switch 90 opens, the relay 110 deactivates to interrupt bootstrapping on of the relay 102. To bootstrap the latch relay 102 to the on condition after interruption requires opening of the reverse switch 90 by placing the vehicle in the reverse condition and temporarily moving the PTO switch 60 to the momentary on position while the PTO relay 126 is activated. Once activated by movement of the PTO switch 60 to the momentary on position, the latch 102 will remain activated until the unlatch relay 110 is deactivated by closing the switch 90.

The PTO relay 126 includes a switched output having one terminal 140 connected by a line 141 to the input terminal 62 of the PTO switch 60 and to a lower output terminal 142 of the brake switch 70. An opposite terminal 143 is connected by a line 144 to the vehicle ignition and the upper output terminal 71 of the PTO switch 60. The terminal 143 and line 144 are also connected to a switched output 146 of an ignition relay 150. The relay 150 includes a control input 152 connected by a blocking diode 154 and a line 156 to an output terminal 158 of the brake switch 70 to provide a current path from the switched power line 46 to the ignition relay control input through a line 159, terminals 56, 66 of the PTO switch 60 and terminal 68 of the brake switch 70 if the PTO switch 60 is off and the brake is on. A second path from the switched power line 46 to the control input 152 of the ignition relay 150 includes an operator presence switch 166 connected to the line 159, a delay circuit 168 connected to the switch 166, and a blocking diode 172 connected to the delay circuit 168. The second path with operator presence switch 166 provides activation of the ignition relay 150 when the operator is at his station on the vehicle and switched power is on. The delay circuit 168 prevents nuisance interruptions of engine operation caused by seat bounce or the like.

The magneto grounding relay 38 includes a control input 182 connected to the ignition relay control input 152 to ground the magneto when the input 152 is unpowered to assure engine kill when power is interrupted to the terminal 152, for example, shortly after opening of the switch 166 when the operator leaves his station. The start relay 48 has a control input 192 connected by the line 156 to the terminal 158 of the brake switch 70 so that the starter can only be activated if the terminal 158 is powered, that is, if the brake is on and the PTO switch 60 is off (switches 60 and 70 are both up in the positions shown). The switch 10, when in the start position, grounds one side of a control coil of the start relay 48 via diode 196 and terminal 24 to provide cranking power to the starter if the line 156 is powered (PTO off and brake on).

In operation, the operator assures that the PTO switch 60 is off and the brake switch 70 is on so that upon movement of the ignition switch 10 to the start position, the magneto relay 38 activates to unground the magneto and the ignition relay 150 activates to provide power to the ignition coil. The start relay 48 activates to turn the starter. Once the engine is running and the ignition switch 10 is in the run position with the operator at his station (the switch 166 is closed), the ignition and magneto relays 38 and 48 will remain activated by operator presence circuit when the vehicle is placed in a forward gear and the brake switch 70 is moved to the off position (down) and/or the PTO switch 60 is moved to the on position. The control input of the PTO relay 126 receives an activation signal through the closed reverse sensing switch 90 (vehicle not in reverse), line 98 and diode 130. However, to initialize PTO operation, the operator must first make sure that the PTO switch 60 is in the off position (up as shown) with the brake switch 70 closing the connection between the terminals 88 and 142 (brake off) so that a closed path is provided through the switches 60 and 70 via terminals 71,62 and 142, 88 from the ignition line 144 to the line 94. Therefore, reengagement of the PTO relay 126 and the PTO 80 after shut down requires that the PTO switch 60 first be moved to the off position.

With the PTO relay 126 on and the PTO switch 60 in the on position, the PTO is activated via line 141 through the terminals 62,72. With the brake off and the switch 70 providing a closed path from the line 141 to the line 94, the PTO relay 126 will be bootstrapped to the on condition through the switch 90, the line 98 and the diode 130 if the vehicle is not placed in the reverse condition. Placing the vehicle in reverse causes the switch 90 to open which interrupts the bootstrap and deactivates the PTO relay 126 to shut down the PTO.

To maintain PTO operation in reverse, the operator first moves the PTO switch 60 to the momentary on position while the PTO is activated to provide an activation signal to the control input 104 of the latch relay 102 via line 106 and terminals 64,84. While holding the PTO switch in the momentary on position, the vehicle is placed in reverse to open the switch 90 which causes the unlatch relay 110 to deactivate closing a bootstrap loop including the diode 132, switched output 136 and latch control input 104 to bootstrap the relay 102 to the on condition. In the on condition, the relay 102 provides power from the line 94 through the blocking diode 120 to the control input 122 of the PTO relay 126 to maintain PTO operation in reverse. Once the relay 102 is bootstrapped to the on condition, the operator releases the PTO switch 60 so that it moves back to the on condition. If the reverse sensing switch 90 is closed, the unlatch relay 110 activates and the bootstrap effect is interrupted to cause the latch relay 102 to drop out. The PTO relay 126 remains on since power is again supplied to the control input 122 from line 94 through the switch 90, the line 98 and the diode 130. If the PTO relay 126 is deactivated for any reason during operation, the PTO switch 60 must first be moved to the off position with the vehicle out of the reverse condition before PTO operation can be resumed.

Having described the preferred embodiment, it will become apparent that various modifications can be made without departing from the scope of the invention as defined in the accompanying claims.

We claim:

1. In a lawn and garden vehicle having an operator station, a ground drive for providing vehicle drive and non-drive conditions including a selector for selecting either forward or reverse vehicle operation, a controllable tool drive (PTO) for powering an accessory, an interlock circuit limiting operation of the vehicle under certain conditions, the interlock circuit comprising:

a PTO switch connected to the PTO, the PTO switch movable to an on condition for activating the PTO, to an off condition for deactivating the PTO, and to momentary on position;

a reverse sensing switch connected to the PTO and the PTO switch and providing a signal in response to the selection of reverse vehicle operation for selectively preventing powering of the accessory by the PTO when reverse operation of the vehicle is selected; and PTO latch structure connected to the PTO switch and responsive to movement of the PTO switch from the on position to the momentary on position when the reverse vehicle operation is selected to power the accessory when reverse operation is selected.

2. The interlock circuit as set forth in claim 1 wherein the PTO switch is biased from the momentary on position to the on position and wherein the PTO switch is releasable from the momentary on position, the PTO latch structure maintaining the powering of the accessory after the reverse vehicle operation is selected and the PTO switch is released from the momentary on position.

3. The interlock circuit as set forth in claim 1 wherein the PTO latch structure includes a latching relay connected to the reverse sensing switch, the latching relay having a control input and a switched output.

4. The circuit as set forth in claim 3 wherein the reverse sensing switch is connected between the PTO switch and the PTO latch structure, and wherein the movement of the PTO switch to the momentary on position provides a closed current path between the control input and the switched output for maintaining the latching relay in an activated condition when the reverse sensing switch is in an open condition.

5. The circuit as set forth in claim 3 wherein the PTO latch structure includes a PTO relay having a control input connected to the switched output of the latching relay.

6. The circuit as set forth in claim 3 wherein the PTO latch structure includes an unlatching relay having a switched output terminal connected to the control input of the latching relay.

7. The circuit as set forth in claim 4 wherein the latch structure prevents powering of the accessory by movement of the PTO switch to the momentary on position when the accessory is in an non-powered condition.

8. In a lawn and garden vehicle having an operator station, a ground drive for providing vehicle drive and non-drive conditions including a selector for selecting either forward or reverse vehicle operation, a controllable tool drive (PTO) for powering an accessory, an interlock circuit limiting operation of the vehicle under preselected operating conditions, the interlock circuit comprising:

a PTO switch connected to the PTO, the PTO switch movable to an on condition for activating the PTO, to an off condition for deactivating the PTO, and to a momentary on position;

a reverse sensing switch connected to the PTO and the PTO switch and responsive to the selection of reverse vehicle operation for selectively preventing powering of the accessory by the PTO when reverse operation of the vehicle is selected;

PTO latch structure connected to the PTO switch and responsive to movement of the PTO switch from the on position to the momentary on position when the reverse vehicle operation is selected while the PTO is activated to maintain PTO activation when reverse operation is selected; and wherein the latch structure is connected to the PTO and is responsive to the deactivating of the PTO to prevent activation of the PTO by movement of the PTO switch to the momentary on position when the PTO is deactivated.

9. The interlock circuit set forth in claim 8 wherein the PTO latch circuit includes a latch relay and an unlatch relay.

10. The interlock circuit set forth in claim 9 wherein the latch relay includes an output and an input, and wherein the output is connected through the unlatch relay to the input for bootstrapping the latch relay to the on condition when the unlatch relay is in a preselected condition.

11. The interlock circuit as set forth in claim 10 wherein the unlatch relay includes a control input connected to the reverse sensing switch for establishing the preselected condition when reverse vehicle operation is selected.

12. The interlock circuit as set forth in claim 10 wherein the latch relay output is connected to the PTO switch, the PTO switch when in the momentary on position providing a closed current path between the latch relay output and the latch relay input to initialize the latch relay when reverse vehicle operation is selected and the PTO switch is placed in the momentary on position.

13. The interlock circuit as set forth in claim 12 including a PTO relay connected to the latch relay output.

14. The interlock circuit as set forth in claim 8 including a PTO relay connected to the PTO switch and to the PTO latch structure and preventing PTO reactivation without movement of the PTO switch to the off position.

15. The interlock circuit as set forth in claim 8 including a PTO relay connected to the PTO switch and to the PTO latch structure, and wherein the reverse sensing switch is connected to the PTO relay and prevents PTO reactivation during reverse operation.

* * * * *